United States Patent [19]
Blakeslee et al.

[11] 3,895,532
[45] July 22, 1975

[54] PRESSURE AND TEMPERATURE COMPENSATED INDICATING APPARATUS FOR FLUID METERS

[75] Inventors: Dirk C. Blakeslee, Verona; Thomas C. Farrell, Glenshaw, both of Pa.

[73] Assignee: Rockwell International Corporation, Pittsburgh, Pa.

[22] Filed: Dec. 10, 1973

[21] Appl. No.: 423,212

[52] U.S. Cl. .................................................. 73/233
[51] Int. Cl. .................................................. G01f 1/08
[58] Field of Search ........ 73/230, 233; 74/191, 192, 74/193

[56] References Cited
UNITED STATES PATENTS

| | | | |
|---|---|---|---|
| 776,455 | 11/1904 | Christie | 74/193 |
| 1,637,664 | 8/1927 | Stoeckicht | 74/192 |
| 3,538,766 | 11/1970 | Kugler | 73/233 X |

Primary Examiner—Jerry W. Myracle

[57] ABSTRACT

A variable ratio drive transmission having means to vary the output to a counter in accordance with variations in both pressure and temperature is driven by a fluid meter. Variations in pressure in absolute terms are sensed by a pressure responsive element enclosed within an evacuated chamber. A master drive element of a magnetically coupled motion transmitter is located within the chamber and connected for movement with the pressure responsive element and the slave element of the motion transmitter is located outside the chamber and connected to an indicator.

2 Claims, 9 Drawing Figures

PRESSURE AND TEMPERATURE COMPENSATED INDICATING APPARATUS FOR FLUID METERS

DISCUSSION OF THE ART AND SUMMARY OF THE INVENTION

This invention relates to means to indicate an integrated volume of fluid flow through a pipeline, the volume indication being corrected for fluid pressure and temperature variations from a base reference point. Typically a fluid meter (not disclosed herein) having a rotor or other flow responsive element is located in a pipeline. When it is not desired to compensate the volume readout for pressure or temperature the output from the flow responsive element is connected to a counter, register or other readout device. However, variations in the pressure and/or temperature of the fluid being metered cause variations in the energy content of the fluid. When the fluid being metered is important for its energy content, for example gas, gasoline and other petroleum products the energy content for a given volume of flow through the meter will be reduced as the pressure decreases or temperature increases and will be increased when the pressure increases or temperature decreases. Such fluids are usually sold on the basis of their energy content at a certain base pressure and temperature. The base temperature is usually 60° Fahrenheit and normally the base pressure is 14.73 pounds per square inch absolute (psia). Thus in metering of such fluids it is desirable to compensate the output from the meter to reflect variations from the base pressure and temperature and in some cases it may be desirable that the pressure sensing and compensating apparatus respond to variations in terms of absolute pressure rather than gage pressure.

Instruments capable of performing such compensating operations are known in the art. However, such known devices are generally complicated, relatively expensive and subject to inaccuracies. Typical of such known devices is the one shown in U.S. Pat. No. 3,169,399. In the device therein shown the drive from the meter output to the register or counter is through a one-way clutch and is in the form of a series of intermittent drive pulses. As a result, for a certain portion of the time during which the output from the meter is in motion the one way drive is being returned to its drive position and no volume is being registered during this time although fluid is flowing through the meter. If the reading from the register is taken during these times it will not present an accurate indicator of the total volume passed through the meter at that point in time. Another problem incident to such devices is that while the pressure correction is performed by an integrating operation the temperature correction is not a separate integrating operation of its own but rather is accomplished by means of adjusting the pressure correction.

To overcome the foregoing disadvantages the instant invention contemplates a novel variable ratio drive whereby the drive from the meter is continuous and provides for a drive ratio adjustment in response to variations of two separate variables for example pressure and temperature. The present invention also provides a true integrating operation for the temperature corrections as well as for the pressure correction.

Another facet of the present invention is the provision of a novel pressure sensing device which senses the absolute pressure of a fluid and by means of which variations in the pressure in absolute terms of the fluid being metered are supplied to the integrator to achieve a pressure corrected or compensated readout of the volume of fluid flow. The absolute pressure cell of the instant invention contemplates an evacuated chamber within which a more or less conventional pressure sensing unit such as Bourdon tube is located, the interior of the tube being subjected to the pressure to be measured. As the measured pressure increases and decreases the Bourdon tube will expand and contract and since the pressure surrounding the sensing element is zero the amount of movement of the sensing element will vary directly with variations in pressure in absolute terms. The instant invention employs novel means of transmitting the motion of the pressure sensing element outside of the evacuated chamber. For this purpose a magnetic drive coupling having magnetically coupled master and slave elements is utilized, the driving or master element of the coupling being mounted within the evacuated chamber for movement with the pressure sensing element. The driven or slave element of the coupling is located outside the chamber and may be drive connected to an indicator to show the pressure in absolute terms or may be drive connected to other instrumentation where input proportional to absolute pressure is desired.

Accordingly, it is an object of the present invention to provide an accurate and sensitive means of indicating the pressure and/or temperature compensated volume of fluid flow through a pipeline. It is another object of this invention to provide a novel, accurate and sensitive variable speed drive the output of which varies in accordance with two variable input signals.

It is another object hereof to provide an instrument in which the ouput of a meter is modified by a novel variable speed drive the output of which is varied in accordance with the temperature and pressure of the fluid being metered to indicate a volume of fluid flow which has been adjusted to compensate for variations in the pressure and/or temperature of the fluid being metered.

A further object hereof is to provide a pressure responsive element which is enclosed in an evacuated chamber and which employs a magnetic coupling to provide an indication of the movement of a pressure sensing element enclosed within an evacuated chamber.

DESCRIPTION OF THE DRAWING

Referring now to the drawings, FIG. 1 shows the indicating mechanism of the present invention including a housing 20 which encloses the various elements of the present invention and is adapted to receive a cover (not shown) which may be secured to it by means of screws threaded into suitable threaded openings 28. Shaft 22 is driven by the output from a fluid meter (not shown) located in a pipeline to measure the flow of the fluid therethrough and is the input to a gear train assembly indicated generally by the number 24.

The variable drive integrating mechanism is best shown in FIGS. 2-7 to which reference will now be had.

Figure 4:
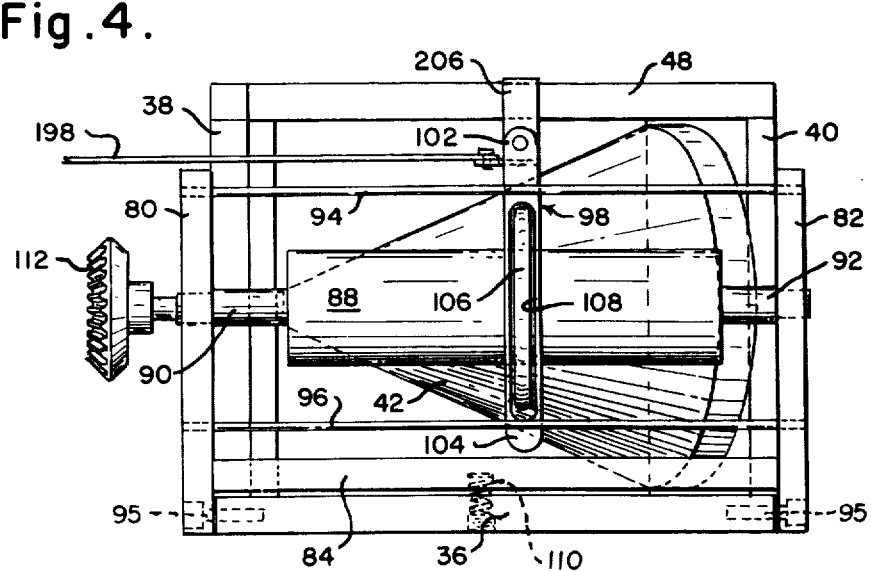
FIG. 4 is a side elevation view of the integrating mechanism viewed from the line 4—4 of FIG. 2.
Figure 5:
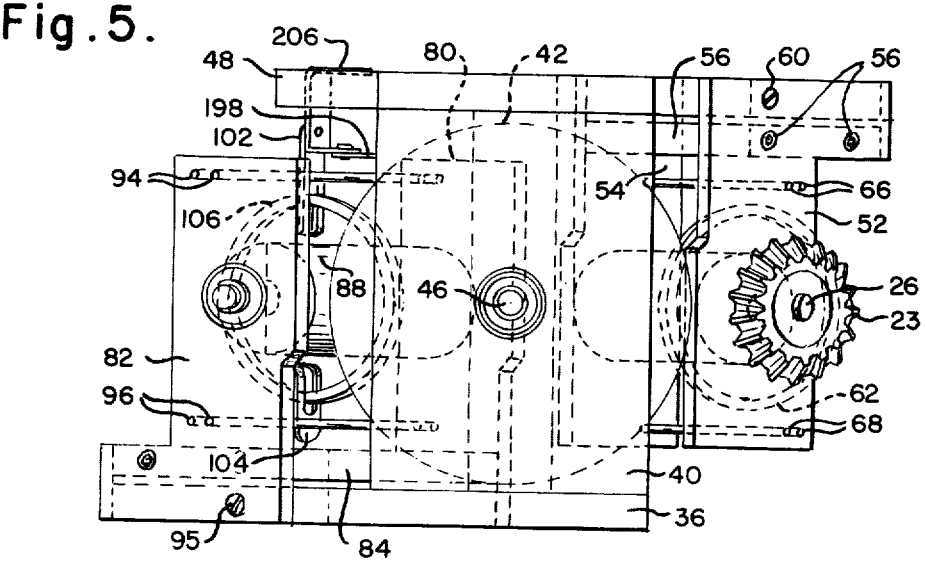
FIG. 5 is an end elevation view of the integrating mechanism viewed from the line 5—5 of FIG. 2.
Figure 6:
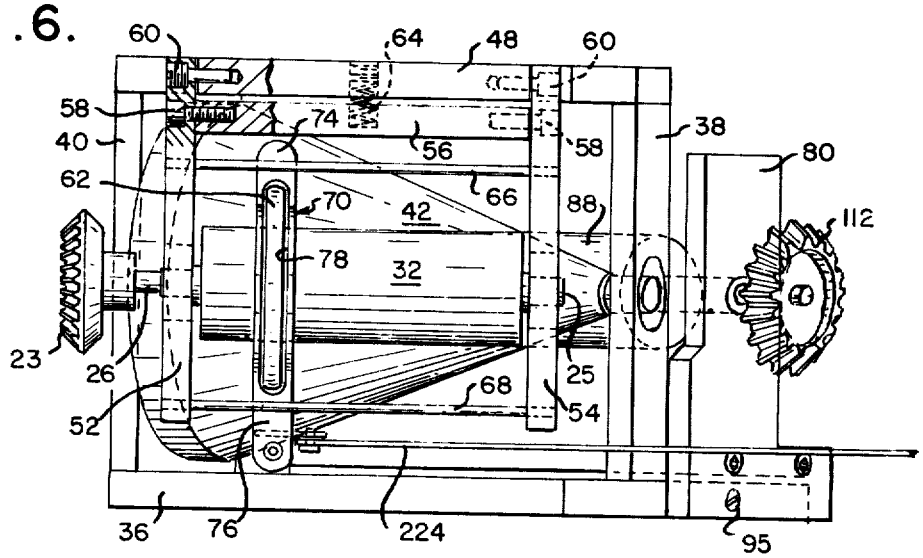
FIG. 6 is an elevation view of the integrating mechanism viewed from the line 6—6 of FIG. 2.

Extending upwardly from base plate 36 and rigidly secured thereto by any conventional means not shown, such as for example screws, are supports 38 and 40. A cone member 42 is rotatably supported in support members 38 and 40 by means of shafts 44 and 46 extending from each end thereof and which are journalled respectively in support members 38 and 40. A cover plate 48 shown in plan outline in FIG. 2 and in elevation in FIGS. 4-6 is rigidly secured to uprights 38 and 40 by any suitable means such as screws 50. As best shown in FIG. 6 support members 52 and 54 are rigidly secured to spacer plate 56 by means of screws 58. Cylinder 32 has shafts 25 and 26 by means of which it is mounted for rotation in support members 54 and 52. The entire structure consisting of support members 52, 54, spacer plate 56, cylinder rotor 32 depends from top cover 38 and is mounted for limited pivotal motion thereon about the axis of pivot pins 60, the axis of pivot pins 60 being substantially in the same vertical plane as the axis of rotation of cylinder 32. Secured to the end of shaft 26 and driven thereby is the output gear 23 of gear train assembly 24.

Figure 3:
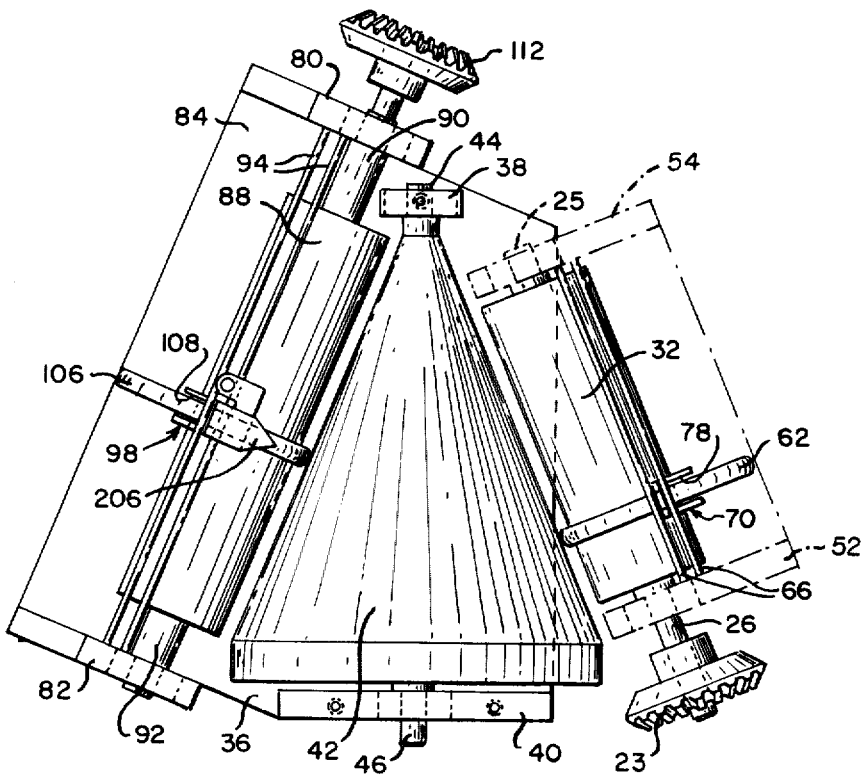
FIG. 3 is a plan view of the integrating mechanism of FIG. 2 with the top cover member removed to more clearly show the elements thereof.
Figure 7:
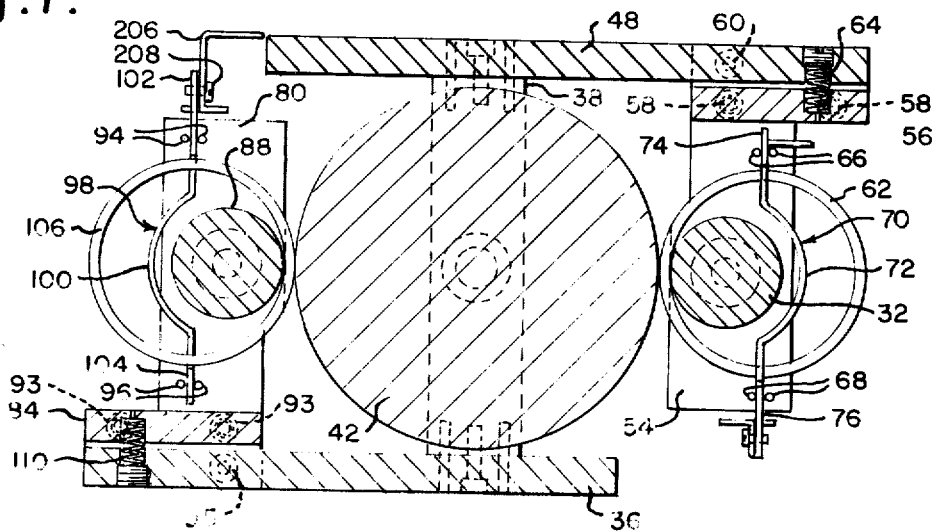
FIG. 7 is a sectional view of an elevation taken along the lines 7—7 of FIG. 2.

As best shown in FIGS. 3, 6 and 7 a ring 62 surrounds the cylinder 32 and is in driving contact with the contiguous surfaces on cylinder 32 and cone 42. A spring 64 contained within mating recess on top cover member 48 and spacer plate 56 as shown in FIG. 7 is compressed between plates 48 and 56. Thus spring 64 urges the support members 52 and 54, spacer plate 56 and cylinder 32 in a clockwise direction as viewed in FIG. 7 whereby the ring 62 is squeezed between cylinder 32 and cone 42 to establish a drive connection therebetween. Two spaced parallel upper guide rails 66 and two spaced parallel lower guide rails 68 extend between support members 52 and 54 in a direction parallel to the axis of drive cylinder 32. Guide member 70 is comprised of a circular segment portion 72 extending from either end of which are ears 74 and 76 which project respectively between upper guide rails 66 and lower guide rails 68 whereby guide member 70 and ring 62 is guided for translatory motion along the length of the guide rails. As best shown in FIGS. 3 and 6 guide member 70 has a slot formed in the circular segmental portions 72 and which extends partially into ears 74 and 76 through which projects ring 62. Thus the ring 62 is contained within the slot 78 and is guided for translatory movement in a direction parallel to the axis of cylinder 32 by the guide member 70 as guide member 70 is caused to move along guide rails 66 and 68 in a manner which will be hereinafter explained.

Referring particularly to FIGS. 2, 3, 4 and 7 upright support members 80 and 82 are rigidly secured to and extend upwardly from either end of spacer plate 84 by any suitable means such as screws 93 (FIG. 7). Cylinder 88 has extending from either end thereof shafts 90 and 92 by means of which it is journalled for rotation in support members 80 and 82. A gear 112 is secured to the end of shaft 90 and rotates with cylinder 88. The whole structure consisting of the uprights 80 and 82, cylinder 88 and spacer plate 84 is pivoted to base 36 by means of pivot pins 95, the axis of which is located substantially in the same vertical plane as the axis of rotation of cylinder 88 as best shown in FIG. 7.

Two spaced parallel upper guide rails 94 and two spaced parallel lower guide rails 96 extend between uprights 80 and 82 in a direction parallel to the axis of cylinder 88. A guide member denoted generally by the numeral 98 has a circular segment portion 100 and ear portions 102 and 104 extending respectively from either end thereof. Ear portions 102 and 104 extend respectively between upper guide rails 94 and lower guide rails 96 for translatory movement along the length of the guide rails in a direction parallel to the axis of rotation of cylinder 88. Drive ring 106 is positioned in surrounding relationship to cylinder 88 and extends partially through a groove 108 formed in guide member 100. Each end of spring 110 is contained within mating recesses formed in the upper and lower surfaces of base member 36 and spacer plate 84 respectively. In the assembly spring 110 is compressed between base 36 and spacer plate 84 so that the entire structure consisting of uprights 80 and 82, spacer plate 84, cylinder 88, guide rails 94 and 96, guide member 98 is urged in a clockwise direction as shown in FIG. 7 whereby ring 106 is squeezed between cone 42 and cylinder 88 to establish a drive connection between cone 42 and cylinder 88. Referring to FIGS. 3, 4, 6 and 7 it will be appreciated that when the integrating apparatus is in operation the drive ring 62 may be moved axially of the cylinder 32 by moving guide member 70 along the length of guide rails 66 and 68. Movement of the ring 62 will cause a variation in the drive ratio between cylinder 32 and cone 42. Similarly ring 106 may be moved axially of the cylinder 88 by movement of guide member 98 along the lengths of guide rails 94 and 96 to thereby adjust the drive ratio between cone 42 and cylinder 88.

Figure 1:
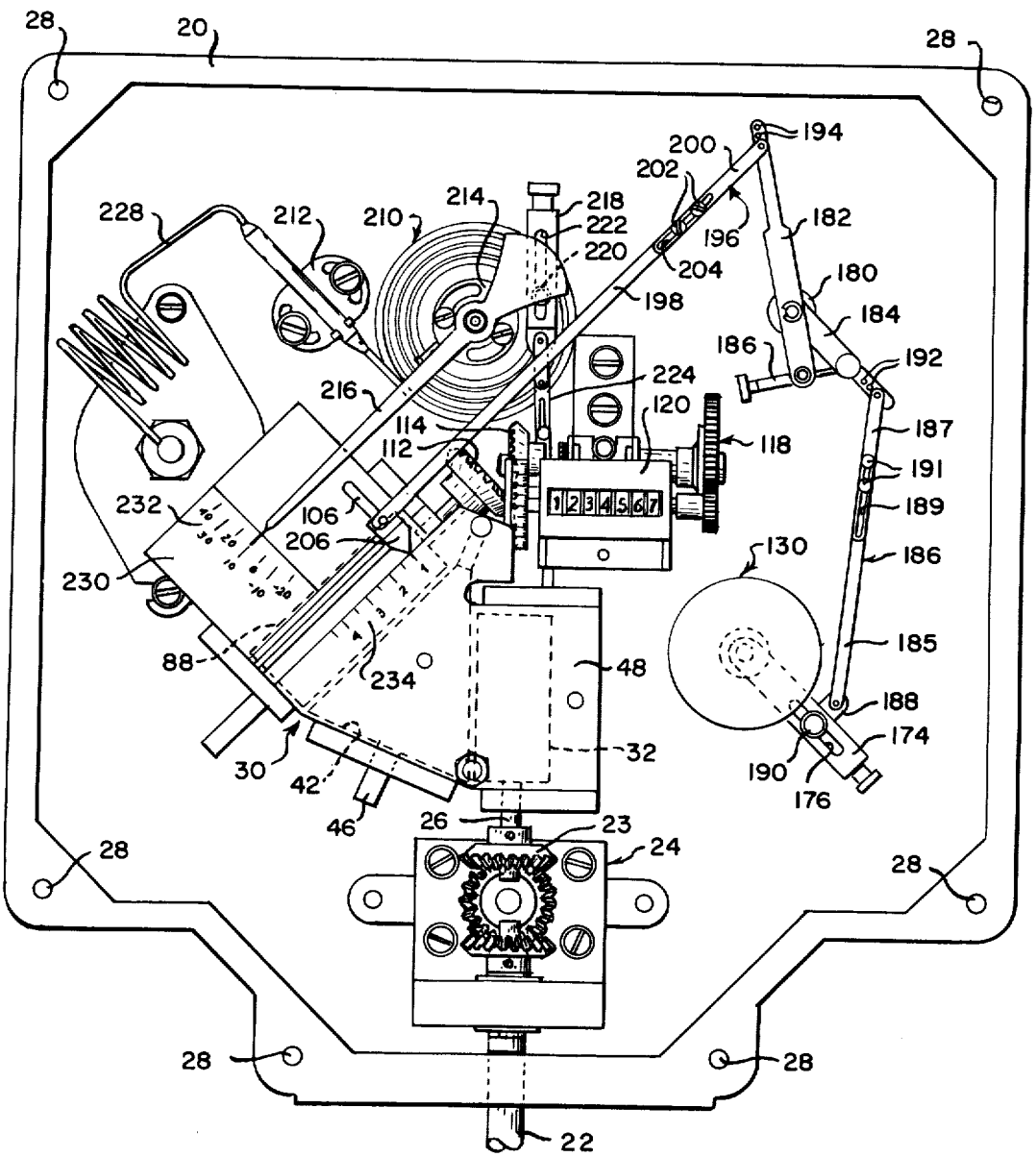
FIG. 1 is a plan view of the indicating mechanism of the present invention showing the relationship between the various elements thereof.
Figure 2:
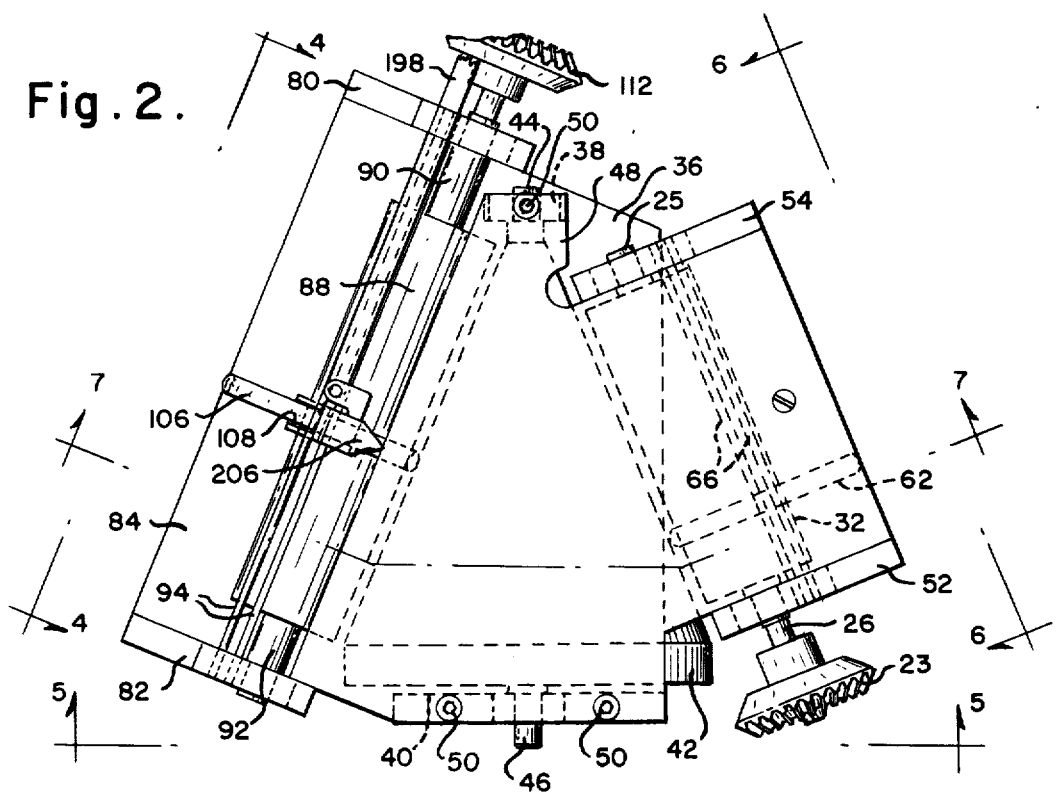
FIG. 2 is a plan view of the integrating mechanism by means of which the output from a fluid meter is modified to reflect variations in the pressure and temperature of the fluid being metered.

Referring to FIG. 1 the drive from the meter is transmitted through shaft 22, gear train assembly 24, shaft 26 to cylinder 32, from cylinder 32 through ring 62 to cone 42 and from cone 42 through ring 106 to cylinder 88. A bevel gear 112 mounted on shaft 90 for rotation with cylinder 88 meshes with a complementary bevel gear 114 which drives digital counter 120 through gear train 118. Thus, it will be seen that by varying the drive ratio between cylinder 32 and cone 42 in accordance with one variable e.g. temperature and by varying the drive ratio between cone 42 and cylinder 88 in accordance with variations in another variable e.g. pressure, the amount registered on register 120 may be made to reflect changes in the two variable quantities.

Figure 8:
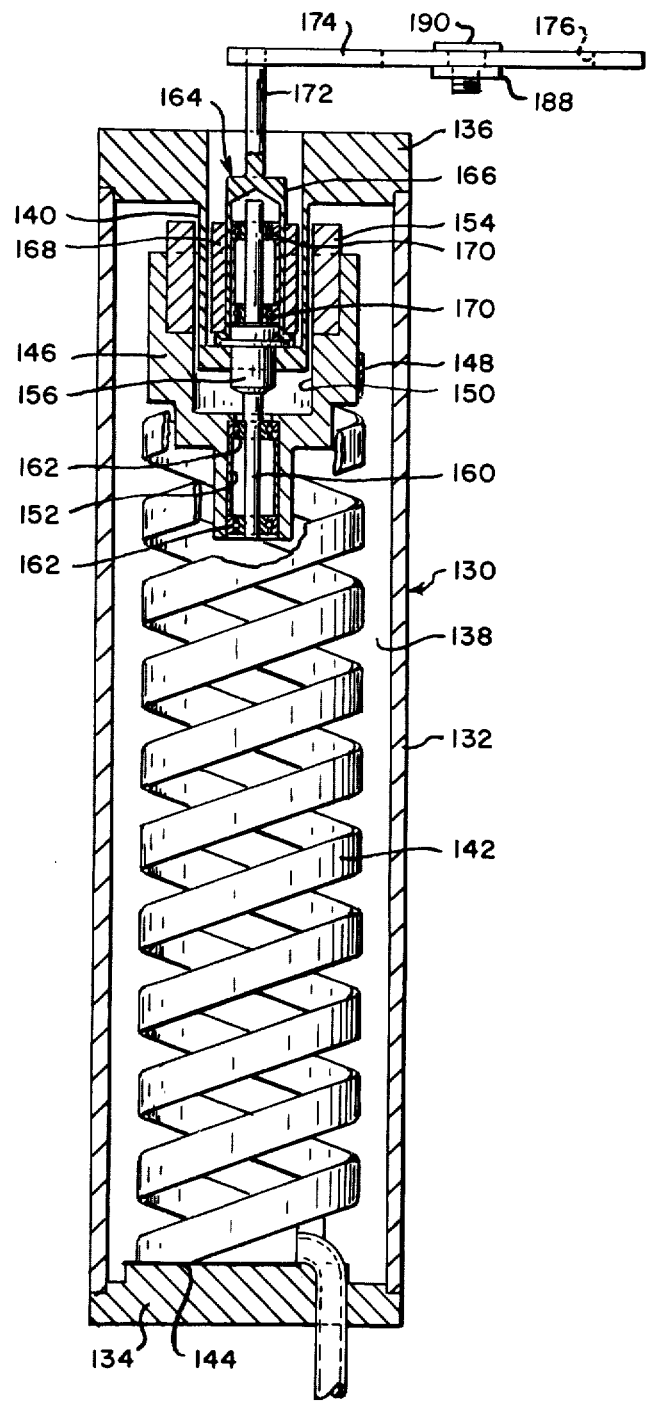
FIG. 8 is an elevation in section of the absolute pressure sensing cell of the present invention.

Referring to FIGS. 1 and 8 absolute pressure cell denoted generally by the numeral 130 has a cylindrical body 132 which has heads 134 and 136 soldered thereto at each end to provide a fluid pressure tight chamber 138 within the cylinder. Integrally formed on head 136 is a depending cylindrical well portion 140 which projects into chamber 138. A pressure sensing element such as a Bourdon tube is enclosed within chamber 138 has one end secured to the head 134 by any convenient means such as by solder as shown at 144. Secured to the other end of the pressure element 142 by means of a solder joint 148 is the master or driving element 146 of magnetic coupling. Driving element 146 has a cylindrical recess 150 and a reduced co-axial cylindrical bore 152. A cylindrical magnet 154 is secured to driving element 146 in such a manner that the inner cylindrical surface of the magnet 154 forms an extension of the surface of cylindrical recess 150, the internal cylindrical surface of magnet 154 and recess 150 being adapted to receive the depending well portion 140 in closely adjacent and co-axial relationship thereto. A mounting pin 156 having oppositely extending co-axial axle portions 158 and 160 is sealingly fitted into an opening in the bottom wall of depending well 140 in co-axial relationship with respect to the well 140 and driving member 146 with axle portion 158 extending upwardly from the bottom wall of well 140 and the axle portion 160 extending downwardly from the bottom wall of depending well 140. Driver member 146 is journalled on axle portion 160 by means of bearings 162 seated in cylindrical recess 152. Thus, the driving member 146 is journalled on axle portion 160 for rotary movement about the axis depending wall 140.

A slave or driven member 164 of the magnetic coupling has a hollow cylindrical portion 166 on the exterior of which is secured a cylindrical magnet 168. The driven member 164 is mounted in depending well portion 140 on axle portion 158 of pin 156 for rotary motion about the axis of depending well portion 140 by means of bearings 170. Driven member 164 has an extension 172 secured to the end of which is an arm 174 in which is formed a slot 176.

The chamber 138 is evacuated so that the pressure therein is substantially zero pounds per square inch absolute. The interior of pressure responsive element 142 is connected to the pipeline in which is located the meter from which the shaft 22 is driven. Therefore, the pressure within the element 142 is the same as, and will vary with variations of, the pressure in the pipelin and since the pressure in chamber 138 will not be affected by changes in atmospheric pressure, the difference in the pressure between the interior of the pressure responsive element 142 and the chamber 138 will be measured in absolute terms. As is well known in the art when the pressure in the pipeline and consequently the pressure within the element 142 decreases or increases, the element 142 will tend to coil and uncoil with such variations in pressure. Since one end of the element 142 is secured to the head 134 the other end of the element 142 on which the driving element 146 is mounted will rotate around the axis of pin 156. Magnets 154 and 168 are polarized in such a manner that rotation of driving element 146 will cause driven element 164 to follow it and to assume a position corresponding to any position driving member 146 is cause to assume by operation of the sensing element 142. It is conventional practice to transmit the movement of the free end of pressure securing element 142 to the exterior of body 132 by means of a shaft or similar member extending through head 136 or body 132. Such a transmitting means must be fluid pressure sealed with respect to the head or body as the case may be to preserve the vacuum or pressure within chamber 138. Such seals impose a frictional resistance to the movement of the transmitting member which in turn adversely affects the accuracy and sensitivity of pressure sensing devices employing such conventional motion transmitting means. The magnetic coupling employed in the instant invention to transmit the motion of the free end of the pressure sensing element to the exterior of the body 132 avoids the use of seals and is virtually free of friction which results in increased accuracy and sensitivity of the instant invention over such conventional devices.

Referring to FIG. 1 rising from the floor of housing 20 is a pin 180 of which is pivotally mounted a link 182 at a point intermediate its ends. Link 184 is also pivotally mounted on post 180 at one of its ends. Thumb screw 186 is threaded to the underside of the free end of link 182 and the free end of the thumb screw is engaged with the end of link 184 in such a manner as to maintain the angular relationship between link 184 and link 182 as determined by the adjustment of the thumb screw 186. Thus, while adjustment of the thumb screw 186 will adjust the angular relationship between links 182 and 184, for any given adjustment the links 182 and 184 will pivot on post 180 in unison. Secured to the free end of 184 is a link 186 the other end of which is pivotally secured to an ear 188 which in turn is adjustably mounted in the groove 176 of arm 174 whereby the position of the ear 188 may be adjusted along the length of slot 176. Ear 188 may be locked in any adjusted position by means of screw 190. Link 186 is made up of two partially overlying elements 185 and 187. Element 187 has a slot 189 and screw 191 extend through the slot and are threaded into element 185. The length of link 186 may therefore be varied by varying the longitudinal position of element 187 with respect to element 185 and locking it into position by screws 191. The upper end of arm 186 may be selectively pivoted to arm 184 in alternate pivot holes two of which are indicated at 192.

The end of link 182 opposite thumb screw 186 has a number of alternate pivot holes two of which are shown at 194 and to which one end of an extendable link 196 may be pivotally attached. As in the case of link 186, link 196 is comprised partially of two overlying elements 198 and 200 the latter of which is adjustably secured to element 198 by means of screw 202 which extend through slot 204 in element 200 and are threaded into the portion of element 198 which underlies element 200 whereby the length of arm 196 may be adjusted to the extent permitted by the length of the slot 204. The opposite end of link 196 is pivotally secured to indicator 206 which in turn is rigidly secured to the upper end of guide member 98 by screw 208 as best shown in FIGS. 1, 4 and 7.

From the foregoing, it can readily be seen that as the arm 174 (FIG. 1 and FIG. 8) is caused to rotate with driven member 164 of the magnetic coupling as a result of pressure variations within the pipeline, through links 186, 184, 182 and 196 the position of drive ring 106 is adjusted along the length of cylinder 88 to vary the drive ratio between cone 42 and cylinder 188 in accordance with such variations in pressure.

A temperature sensing coil indicated generally be the number 210 has its outer end fixed with respect to the floor of housing 20 by means of a rigid mounting shown generally at 212. The inner and movable end of the temperature sensitive coil element 210 has secured thereto a plate 214 to which is secured an indicator 216. Link 218 is also secured to plate 214 by means of a screw 220 which projects through slot 222 in link 218 and is threaded into plate member 214. Thus the position of the link 218 with respect to the plate 214 may be adjusted along the length of slot 222 and locked in adjusted position by means of screw 220. The end of link 218 has pivoted thereto one end of arm 224 the other end of which is pivotally attached to guide member 62 by means of a bracket secured to the lower end of guide 62 as best shown in FIG. 6. The link 224 is made up of overlying elements adjustable with respect to each other in the same fashion as elements 198 and 200 of link 196 and in the same manner as elements 185 and 187 of link 186 whereby the length of link 224 may be adjustable in the same manner as the length of links 186 and 196.

The interior of coil element 210 communicates with conduit 228 which in turn extends through the bottom well of housing 20 and terminates in a hollow capsule (not shown) which is located in the pipeline carrying the fluid being metered. The interior of the coil 210, conduit 228 and the capsule make up a sealed system in which is contained a fluid which expands and contracts in a known manner with changes in the temperature of the fluid in which the capsule is immersed. Thus as the temperature in the pipeline varies, the fluid within the closed system comprising the capsule, the conduit 228 and the coil element 210 expands and contracts causing the coil element 210 to expand and contracts thereby causing the inner free end thereof to which the plate member 214, indicator 216 and the links 218 and 224 have been connected, to rotate about the axis of coil 210 with changes in temperature of the fluid being metered. Thus as the temperature of the metered fluid fluctuates, the position of the drive ring 106 will be adjusted by motion transmitting links 218 and 224 along the axis of cylinder 88 to adjust the drive ratio between cone 42 and cylinder 88 in accordance with such fluctuations in temperature.

An indicator plate 230 having a temperature scale 232 inscribed thereon is mounted on and extends from spacer plate 84. Indicator 216 cooperates with scale 230 to provide a visual indication of the temperature of the fluid in the pipeline. Similarly a pressure scale 234 is inscribed on cover plate 48 with which indicator 206 cooperates to provide a visual indication of the pressure of the fluid in the pipeline.

In operation the drive from meter in the pipeline to the register 120 is through shaft 22, a gear train assembly 24, cylinder 32, ring 62, cone 42, ring 106, cylinder 88, bevel gears 112 and 114 gear train 118 to counter 120. The interior of pressure sensing element 142 and the capsule to which the conduit 228 is connected are connected into the pipeline at a point close to the meter from which the shaft 22 is driven. Any change in the pressure in the pipeline will cause the sensing element 142 to expand or contract thereby rotating driving element 146 to a position corresponding to the new pressure, the driven element 164 following the driving element under the influence of the magnetic attraction between the magnets 154 and 168. Rotation of driven member 164, through arm 174, links 186, 194, 182 and 196 will adjust the position of ring 106 to change the drive ratio from cone 42 to cylinder 88 to correspond to the new pressure in the pipeline. Decreases in the pressure will cause the ring to move toward the apex of cone 42 while increases in pressure will cause the ring to move away from the apex.

Similarly changes in the temperature of the fluid in the pipeline will cause coil 210 to expand or contract to rotate the plate 214 and indicator 216 to a position corresponding to the new temperature. Rotation of plate 214 through links 218 and 224 will adjust the position of ring 62 to correspond to the new temperature. The drive ratio from cylinder 32 to cone 42 is therefore adjusted in accordance with temperature and the amount of rotation of the cone 42 is proportional to volume through the meter over a given period of time corrected for temperature. Adjustment of the position of ring 106 by pressure element 142 applies a correction to the ratio of the drive from the cone 42 to cylinder 88 whereby the rotation of cylinder 88 reflects metered volume over a given period of time corrected for both pressure and temperature.

In the integrator drive arrangement herein described it should be noted that the rotation of cone 42 is proportional to the uncorrected volume measured by the meter corrected for temperature and the rotation of cylinder 88 is proportional to the rotation of cone 42 with the correction for pressure superimposed thereon; thus the rotation of cylinder 88 is proportional to volume corrected for both pressure and temperature. It is important that the correction for temperature be interposed by means of an arrangement of elements in which the direction of the drive is from cylinder to cone rather than from cone to cylinder. On the other hand the correction for pressure must be interposed by means of an arrangement of elements in which the direction of drive is from the cone to the cylinder. The reason for this can be seen from the following expression which states the relationship betwen the corrected volume and uncorrected volume in terms of variable and base temperatures and pressures.

$$V_c = V \frac{(P_v)}{(P_b)} \times \frac{(460 + T_b)}{(460 + T_v)}$$

in which $V_c$ = Volume corrected for pressure and temperature
$V$ = Volume measured by meter uncorrected for pressure or temperature
$P_v$ = Absolute press of the fluid
$P_b$ = Base pressure in absolute terms to which correction is to be made (usually 14.73 psia)
$T_b$ = Base temperature in degrees Fahrenheit to which correction is to be made (usually 60°F)
$T_v$ = Temperature of fluid in degrees Fahrenheit From the foregoing expression it will be seen that the corrected volume $V_c$ varies with the reciprocal of or inversely with the variable temperature $T_v$ while $V_c$ varies directly and linearly with the variable pressure $P_v$. An inverse relationship between $V_c$ and $T_v$ is obtained in the above described integrator by arranging the elements so that the direction of drive is from the meter to cylinder 32 to cone 42 through ring 62 and applying the temperature correction by varying the drive ratio between the cylinder 82 and cone 42. Conversely to obtain a direct and linear relationship between $V_c$ and $P_v$ the pressure correction must be applied to an arrangement in which the drive is in the direction from the cone 42 to the cylinder 88 the pressure correction being applied by varying the ratio of the drive from the cone to the cylinder. Thus it may be stated that a direct and linear relationship between the variable quantity and the corrected quantity is obtained by an arrangement of elements whereby the rotation of the cylinder driven thereby represents the corrected quantity while an inverse relationship between such quantities is obtained by an arrangement of elements whereby the rotation of the cylinder represents the uncorrected quantity and the rotation of the cone represents the corrected quantity.

The various linkages connecting the pressure and temperature sensing elements with their respective drive rings provide for adjustments in the lengths of the various linkages and the angular orientation of certain of the links with respect to others. Thus, the pivot holes 192 in link 184 provides a coarse adjustment for the pressure range of integrator and value of the base pressure to which correction is to be made while adjustment of the position of ear 188 along the length of groove 176 in arm 174 permits a fine adjustment for the base pressure and the range of travel of ring 106 and therefore in the range of pressures over which compensation or correction may be had. Alternate pivot holes 194 in arm 182 provide another means to adjust the base pressure and pressure range. Ear 188 also provides a means of compensating for differences in movements of different pressure sensing elements for given changes in pressure.

The length of link 186 may be adjusted by adjustment of element 187 with respect to element 185 to compensate for non-linearity of the motion of the pressure sensing element and the non-linearity of the translatory movement of the links 186 and 196 produced by rotational movement of arms 174 and 182. The offset or zero adjustment for pressure is made by adjusting thumb screw 186 to adjust the angle between arm 182 and 184.

Similarly the length of arm 224 may be changed to provide a coarse offset or zero adjustment for temperature while a fine offset or zero adjustment is made by adjusting the position of screw 220 in slot 222.

No means are shown in FIG. 1 to provide an adjustment in the temperature span or range of temperature over which the integrator is to operate. Such an adjustment could be provided by providing means to adjust the screw 220 radially of the axis of element 210 such as for example by mounting a bracket on plate 214 for adjustment radially of the axis of element 210 and threading the screw 220 into said bracket.

The integrating apparatus shown in FIGS. 1–7 utilizes an arrangement of drive elements comprising two cylinders and one cone. The same results as those achieved with the arrangement of FIGS. 1–7 can be obtained by an arrangement utilizing two cones and one cylinder as shown schematically in FIG. 9. In such an arrangement a single cylinder 254 is interposed between two cones 250 and 252 with drive ring 256 establishing the drive connection between cone 250 and cylinder 254 and drive ring 258 establishing the drive between cylinder 254 and cone 258. In such an arrangement the drive from the meter or shaft 22 (FIG. 1) is connected to either one of cones 250 or 252 and the corrected output taken from the other cone. For example if cone 250 is connected to the meter the drive through the integrator would be from cone 250 through drive ring 256 to cylinder 254 and from cylinder 254 through ring 258 to cone 252, cone 252 being connected through suitable gearing to the counter 120 to show the pressure and temperature corrected volume passed through the meter over a given period of time. In such an arrangement the pressure sensitive element is connected to adjust the position of drive ring 256 and the temperature sensitive element is connected to adjust the position of drive ring 258. Thus pressure variations are applied to adjust the drive ratio from the cone 250 to the cylinder 254 so that the volume reading will vary directly and linearly with the pressure ($P_v$) while the temperature variations are applied to adjust the drive ratio from the cylinder 254 to the cone 252 so that the volume reading will vary inversely with the temperature ($T_v$) all as required by the expression stated above. If the drive from the meter were connected to cone 252 the output of the integrator would be taken from cone 250 and the pressure and temperature sensing elements would be connected to rings 258 and 256 respectively.

Figure 9:
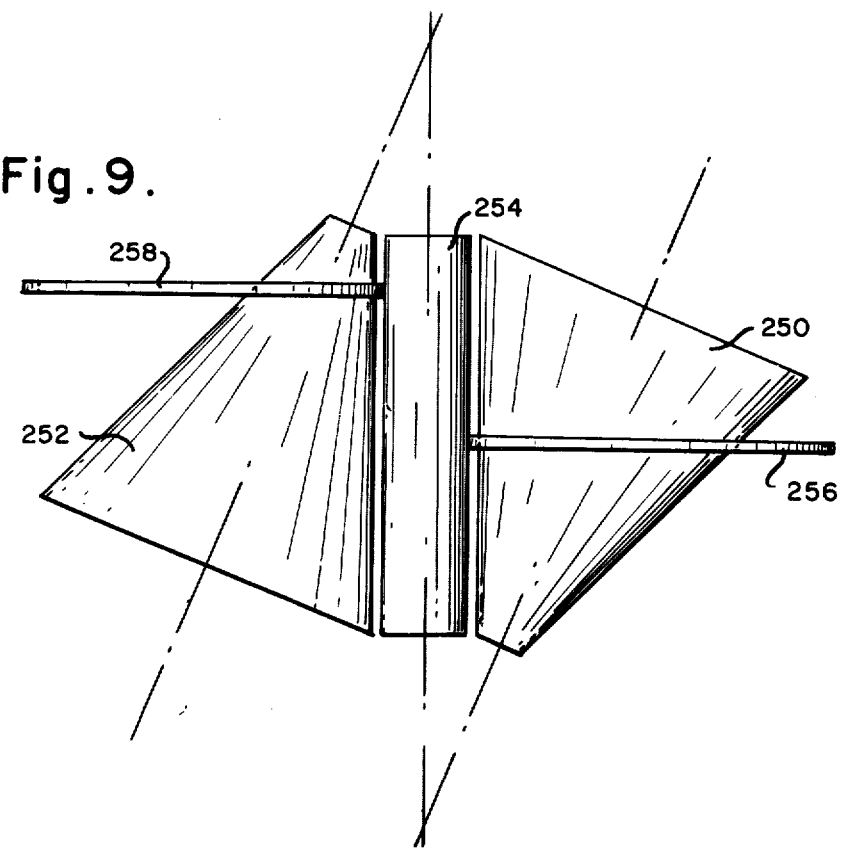
FIG. 9 is a schematic drawing of a modified form of the integrating apparatus.

In both the embodiment of FIGS. 1–7 and the embodiment of FIG. 9 the two outer drive elements rotate about axes which intersect the axis of rotation of the central drive element at angles equal to one-half the included apex angle of the respective cone elements. In the case of the FIG. 9 embodiment each cone drive element may in some instances have a different included apex angle in which case the axis of rotation of each cone would intersect the axis of rotation of the central element at an angle equal to one-half of its respective included apex angle. In the FIGS. 1–7 embodiment the axes of rotation of the two outer cylindrical members converge and intersect the axis of rotation of the central cone element adjacent the same end thereof while in the embodiment shown in FIG. 9 the axis of rotation of the two outer or cone drive elements are parallel to each other and intersect the axis of rotation of the central cylindrical drive element at points between which the central drive element is located. It should be noted however, that if desired the two outer cone drive elements of the FIG. 9 embodiment may be oriented so that the apex of each is located at the same end of the central or cylindrical drive element without changing the operation of the arrangement of FIG. 9 in which case the axes of rotation of the cone drive elements converge and intersect the axis of rotation of the central elements adjacent the same end thereof.

What I claim and desire to have secured by letters Patent is:

1. Apparatus for indicating the volume of fluid flow in a pipeline comprising means adapted to be driven by a fluid meter in a pipeline, a first drive element mounted for rotation about its axis, a second drive element mounted for rotation about its axis to one side of said first drive element and in side-by-side relation thereto, one of said drive elements being a cylinder and the other a cone, a third drive element mounted for rotation about its axis on the other side of said first drive element and in side-by-side relation thereto, one of said last two mentioned drive elements being a cone and the other a cylinder, the axes of rotation of said second and third drive elements being angularly disposed with respect to the axis of rotation of said first element whereby adjacent lengthwise portions of said first and second drive elements are spaced and parallel to each other and adjacent lengthwise portions of said first and third drive elements are spaced and parallel to each other, a first drive ring encircling said second element and in driving contact between said lengthwise portions of said first and second drive elements, a second drive ring encircling said third drive element and in driving contact between said lengthwise portions of said first and third drive elements, means to adjust the position of one of said rings axially of said first drive member in accordance with variations in the pressure of the fluid in said pipeline, means to adjust the position of the other of said rings axially of said first drive element in accordance with variations in the temperature of the fluid in said pipeline, means drive connecting said second drive element with said first mentioned means and means drive connecting said third drive element with indicating means adapted to indicate a cumulative total volume of fluid flow through said meter, said first drive element being a cylinder and said second and third drive elements being cones.

2. The apparatus of claim 4 in which the position of said first ring is adjustable in accordance with variation in the pressure of said fluid and the position of said second ring is adjustable in accordance with variations in the temperature of said fluid.

* * * * *